US 11,408,656 B2

(12) United States Patent
Okoshi et al.

(10) Patent No.: US 11,408,656 B2
(45) Date of Patent: Aug. 9, 2022

(54) HEAT SOURCE DEVICE AND REFRIGERATION CYCLE DEVICE

(71) Applicant: Mitsubishi Electric Corporation, Tokyo (JP)

(72) Inventors: Yasushi Okoshi, Tokyo (JP); Takuya Ito, Tokyo (JP); Yoshio Yamano, Tokyo (JP); Takahiro Akizuki, Tokyo (JP); Tomoyoshi Obayashi, Tokyo (JP); Kimitaka Kadowaki, Tokyo (JP); Naoya Mukaitani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 110 days.

(21) Appl. No.: 16/968,264

(22) PCT Filed: Mar. 7, 2018

(86) PCT No.: PCT/JP2018/008717
§ 371 (c)(1),
(2) Date: Aug. 7, 2020

(87) PCT Pub. No.: WO2019/171486
PCT Pub. Date: Sep. 12, 2019

(65) Prior Publication Data
US 2021/0033326 A1     Feb. 4, 2021

(51) Int. Cl.
*F25B 49/02*      (2006.01)
*F25B 13/00*      (2006.01)

(52) U.S. Cl.
CPC ............. *F25B 49/02* (2013.01); *F25B 13/00* (2013.01)

(58) Field of Classification Search
CPC ........ F25D 17/04; F25D 21/002; F25D 21/02; F25D 17/062; F25D 21/006; F25D 21/08; F25D 2317/067
See application file for complete search history.

(56) References Cited

U.S. PATENT DOCUMENTS 3,827,483 A *   8/1974   Hopkinson ............... F24F 1/06
                                                           165/145
4,646,538 A *   3/1987   Blackshaw ............ F25B 41/20
                                                             62/238.7

(Continued)

FOREIGN PATENT DOCUMENTS

EP        3 115 707 A1     1/2017
EP        3 228 951 A1    10/2017

(Continued)

OTHER PUBLICATIONS

International Search Report of the International Searching Authority dated May 22, 2018 for the corresponding International application No. PCT/JP2018/008717 (and English translation).

(Continued)

*Primary Examiner* — Henry T Crenshaw
(74) *Attorney, Agent, or Firm* — Posz Law Group, PLC

(57) ABSTRACT

A heat source device includes a heat medium channel through which a heat medium flows, a plurality of refrigerant circuits through which refrigerant circulates, and a plurality of heat-medium heat exchangers configured to cause heat exchange to be performed between the heat medium in the heat medium channel and the refrigerant in the refrigerant circuits. The plurality of heat-medium heat exchangers include a first heat-medium heat exchanger to which at least one of the refrigerant circuits is connected and a second heat-medium heat exchanger to which a greater number of the refrigerant circuits are connected than to the first heat-medium heat exchanger.

15 Claims, 6 Drawing Sheets

(56) References Cited

U.S. PATENT DOCUMENTS

| | | | | |
|---|---|---|---|---|
| 5,236,336 A | * | 8/1993 | Hitoshi | F28D 1/05383 165/153 |
| 5,860,285 A | * | 1/1999 | Tulpule | F24F 1/06 62/127 |
| 2012/0125033 A1 | | 5/2012 | Tanno et al. | |
| 2013/0333409 A1 | | 12/2013 | Tanno et al. | |
| 2016/0003490 A1 | * | 1/2016 | Motomura | F24F 3/065 62/196.1 |

FOREIGN PATENT DOCUMENTS

| | | | |
|---|---|---|---|
| EP | 3 477 221 A1 | | 5/2019 |
| JP | 2007-187353 A | | 7/2007 |
| JP | 2008-185256 A | | 8/2008 |
| JP | 2008-267722 A | | 11/2008 |
| JP | 2011-058663 A | | 3/2011 |
| JP | 2012-180970 A | | 9/2012 |
| JP | 2013-036683 A | | 2/2013 |
| JP | 2013-061115 A | | 4/2013 |
| JP | 2013-061115 A | * | 4/2013 |
| JP | 5401563 B2 | | 11/2013 |
| JP | 5555701 B2 | | 6/2014 |
| JP | 2016-080179 A | | 5/2016 |
| JP | 2017-072357 A | | 4/2017 |
| WO | 2013/021762 A1 | | 2/2013 |
| WO | 2015/125863 A1 | | 8/2015 |
| WO | 2016/088262 A1 | | 6/2016 |
| WO | 2017/221383 A1 | | 12/2017 |

OTHER PUBLICATIONS

Office Action dated Oct. 19, 2021 issued in corresponding JP patent application No. 2020-504545 and English translation).
Office Action dated May 11, 2021 issued in corresponding JP patent application No. 2020-504545 and English translation).

* cited by examiner

HEAT SOURCE DEVICE AND REFRIGERATION CYCLE DEVICE

CROSS REFERENCE TO RELATED APPLICATION

This application is a U.S. national stage application of PCT/JP2018/008717 filed on Mar. 7, 2018, the contents of which are incorporated herein by reference.

TECHNICAL FIELD

The present disclosure relates to a heat source device including a plurality of heat-medium heat exchangers and to a refrigeration cycle device.

BACKGROUND ART

A related art refrigeration cycle system includes a plurality of heat-medium heat exchangers (for example, refer to Patent Literature 1). In a refrigeration cycle system disclosed in Patent Literature 1, a plurality of refrigerant circuits are connected to each of a plurality of heat-medium heat exchangers.

CITATION LIST

Patent Literature

Patent Literature 1: Japanese Unexamined Patent Application Publication No. 2013-61115

SUMMARY OF INVENTION

Technical Problem

A refrigeration cycle system reduces its capacity when temperature in an air-conditioned space approaches a target temperature, for example. In Patent Literature 1, the refrigeration cycle system lowers its capacity by decreasing the number of refrigerant circuits in operation. Unfortunately, if at least one of the refrigerant circuits connected to one of the heat-medium heat exchangers stops operation, the related art technique of Patent Literature 1 causes a reduction in efficiency of heat exchange performed by the one heat-medium heat exchanger. This is because, in the one heat-medium heat exchanger, heat of refrigerant in the refrigerant circuit in operation is removed by refrigerant in the refrigerant circuit in non-operation. Moreover, in the one heat-medium heat exchanger, a heat transfer area through which a heat medium removes heat from the refrigerant decreases because of presence of the refrigerant circuit in non-operation. In Patent Literature 1, as described above, when the capacity of the refrigeration cycle system decreases, energy efficiency of the system declines due to a reduction in heat exchange efficiency of the heat-medium heat exchanger.

The present disclosure is made in view of the problem described above, and an object thereof is to provide a heat source device that contributes to improved energy conservation.

Solution to Problem

A heat source device according to an embodiment of the present disclosure includes a heat medium channel through which a heat medium flows, a plurality of refrigerant circuits through which refrigerant circulates, and a plurality of heat-medium heat exchangers to cause heat exchange to be performed between the heat medium in the heat medium channel and the refrigerant in the refrigerant circuits. The plurality of heat-medium heat exchangers include a first heat-medium heat exchanger and a second heat-medium heat exchanger, at least one of the refrigerant circuits being connected to the first heat-medium heat exchanger, a greater number of the refrigerant circuits being connected to the second heat-medium heat exchanger than to the first heat-medium heat exchanger.

Advantageous Effects of Invention

The heat source device according to the embodiment of the present disclosure has the first heat-medium heat exchanger, to which the at least one refrigerant circuit is connected, and the second heat-medium heat exchanger, to which the greater number of the refrigerant circuits are connected than to the first heat-medium heat exchanger. The heat source device according to the embodiment of the present disclosure selectively stops operation of the refrigerant circuits to reduce its capacity and thereby inhibits a decrease in overall heat exchange efficiency of the plurality of heat-medium heat exchangers. Thus, the technique of the present disclosure provides a heat source device that contributes to improved energy conservation.

DESCRIPTION OF EMBODIMENTS

Figure 1:
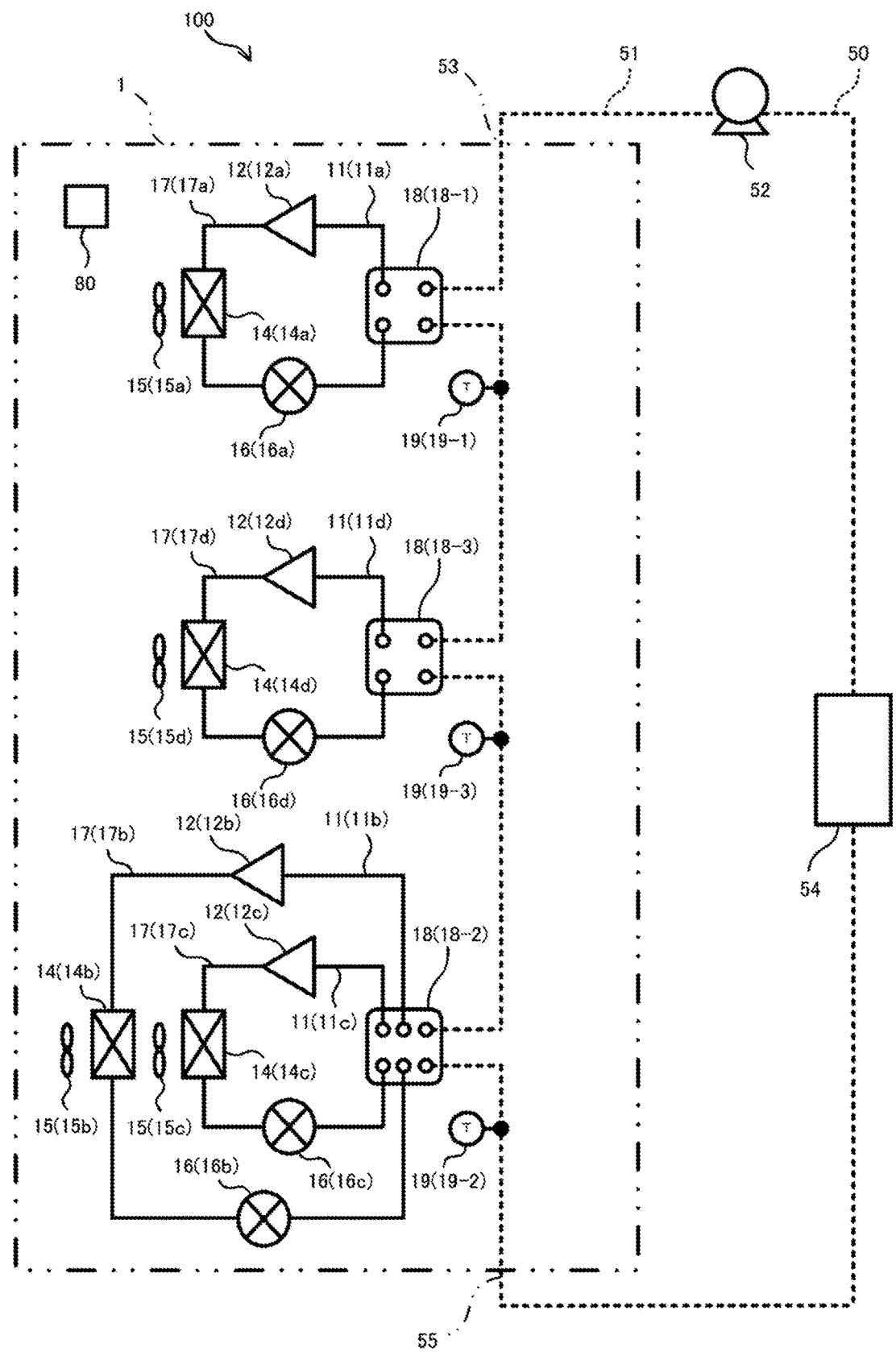
FIG. 1 illustrates an example of a refrigeration cycle device according to Embodiment 1 of the present disclosure.

Embodiments of the present disclosure will be described hereinafter with reference to the drawings. In the drawings, identical or equivalent components are denoted by identical reference signs, and descriptions thereof are omitted or simplified as appropriate. The shapes, sizes, dispositions, and other properties of components shown in the drawings may be appropriately changed with the scope of the present disclosure.

Embodiment 1

[Refrigeration Cycle Device]

Figure 2:
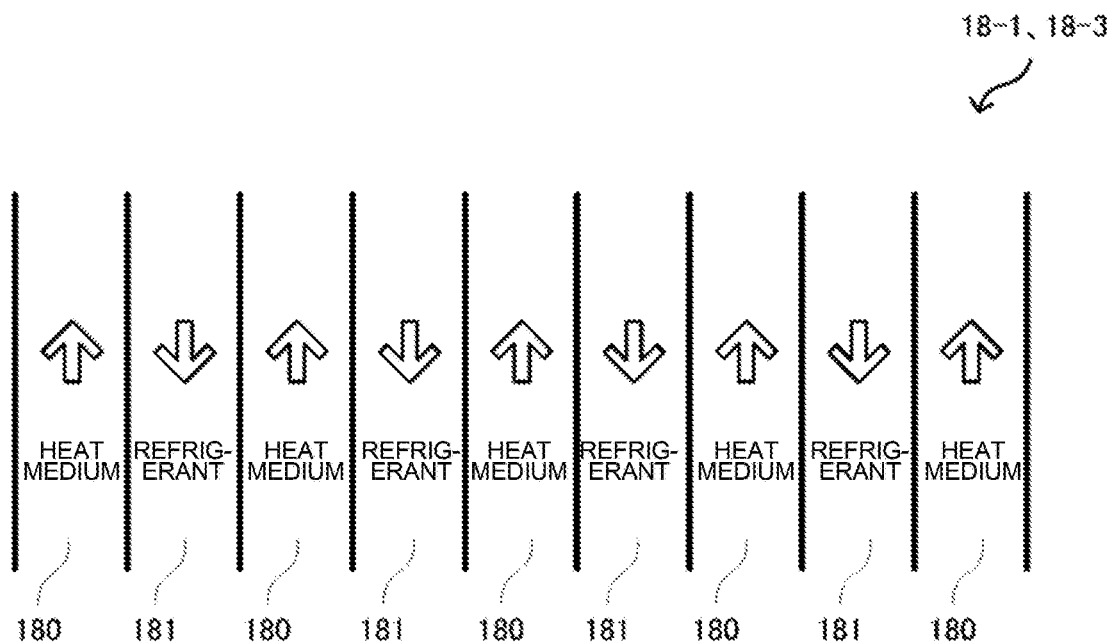
FIG. 2 illustrates an example of one of a first heat-medium heat exchanger and a third heat-medium heat exchanger shown in FIG. 1.
Figure 3:
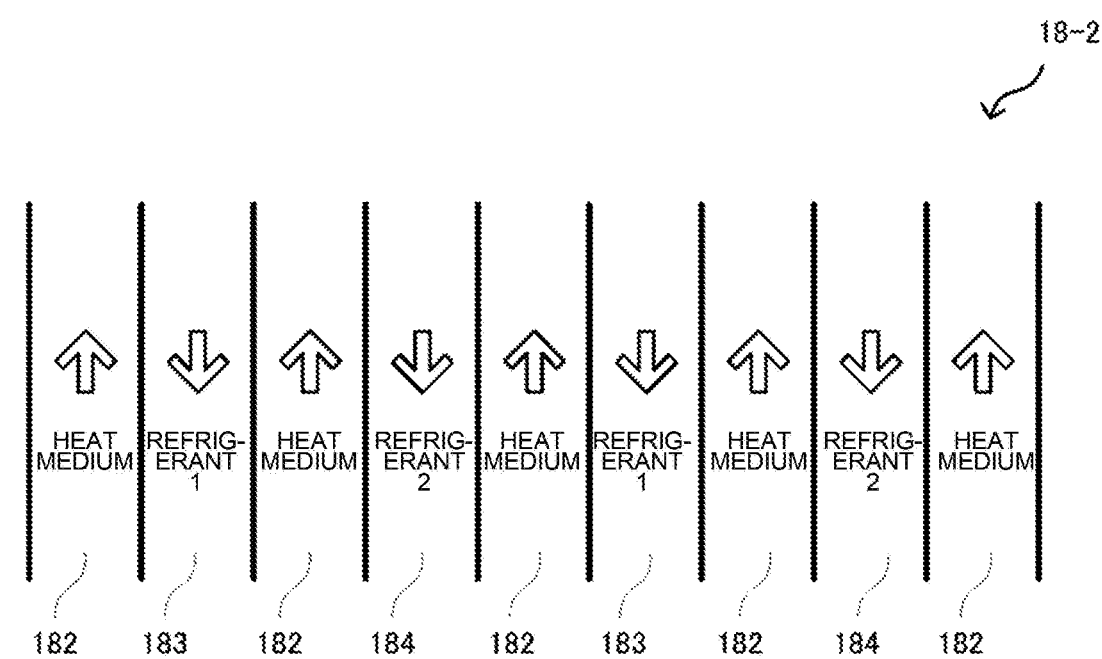
FIG. 3 illustrates an example of a second heat-medium heat exchanger shown in FIG. 1.

FIG. 1 illustrates an example of a refrigeration cycle device according to Embodiment 1 of the present disclosure. FIG. 2 illustrates an example of one of a first heat-medium heat exchanger and a third heat-medium heat exchanger shown in FIG. 1. FIG. 3 illustrates an example of a second heat-medium heat exchanger shown in FIG. 1. A refrigeration cycle device 100 shown in FIG. 1 is, for example, designed to air-condition large buildings or other structures.

The refrigeration cycle device 100 is designed to perform air-conditioning by allowing a heat source device 1 to cool a heat medium and making use of the cooled heat medium. When the heat source device 1 is designed to heat a heat medium, the refrigeration cycle device 100 can perform air-conditioning using the heated heat medium. When the heat source device 1 is designed to switch cooling and heating of a heat medium, the refrigeration cycle device 100 can perform air-conditioning using the cooled or heated heat medium. When the heat source device 1 is designed to simultaneously cool and heat heat mediums, the refrigeration cycle device 100 can perform air-conditioning using the cooled and heated heat mediums.

The refrigeration cycle device 100 includes a heat medium channel 50 that is formed such that the heat source device 1, a heat medium sending device 52, and a load device 54 are connected together by a heat medium pipe 51. The heat medium sending device 52 is used to send the heat medium and is, for example, a pump. The heat medium sending device 52 may be built in the heat source device 1 or the load device 54. The heat medium channel 50 has an annular shape, for example, and is used to circulate the heat medium. The heat medium channel 50 may be designed such that at least part of the heat medium does not circulate through the channel. The heat medium that does not circulate through the heat medium channel 50 is used for hot-water supply, for example. The heat medium is, for example, water. The heat medium may be brine, carbon dioxide, or other substances. The refrigeration cycle device 100 may be designed such that the heat medium channel 50 is provided with a device such as a tank for storing a heat medium or a heat medium supply device for supplying a heat medium.

The load device 54 is a device that uses heat of the heat medium. The load device 54 is, for example, an indoor unit of an air-conditioning device that air-conditions a room, i.e., an air-conditioned space. The load device 54, for example, includes a finned tube heat exchanger made up of a fin and a tube and a fan to send air to the heat exchanger. The fan operates and thereby blows air-conditioned air, which has passed through the heat exchanger for heat exchange, into the air-conditioned space. The load device 54 may be another device such as a heat exchanger of a radiation type or a water heater. In FIG. 1, one unit of the load device 54 is shown, for example. However, the refrigeration cycle device may include two or more units of the load device 54. The two or more units of the load device 54 are connected in parallel or in series.

[Heat Source Device]

The heat source device 1 is, for example, an outdoor unit disposed outside the air-conditioned space. The heat source device 1 is disposed at a place, such as outdoors or in a machine room that is outside the room forming the air-conditioned space. The heat source device 1 has an inflow port 53 into which the heat medium flows and an outflow port 55 from which the heat medium flows. The heat medium that has flowed in through the inflow port 53 is heated or cooled and flows out through the outflow port 55. The heat source device 1 accommodates a plurality of refrigerant circuits 11, a plurality of heat-medium heat exchangers 18, a temperature sensor 19, and a controller 80. The temperature sensor 19 is used to detect temperature of the heat medium. The temperature sensor 19, for example, includes a thermistor or a thermocouple. The heat source device 1 in FIG. 1 has a first temperature sensor 19-1, a second temperature sensor 19-2, and a third temperature sensor 19-3. The first temperature sensor 19-1 detects temperature of the heat medium flowing out from a first heat-medium heat exchanger 18-1, the second temperature sensor 19-2 detects temperature of the heat medium flowing out from a second heat-medium heat exchanger 18-2, and the third temperature sensor 19-3 detects temperature of the heat medium flowing out from a third heat-medium heat exchanger 18-3. A heat source device 1 in an example of the present embodiment may have at least one temperature sensor 19, although the heat source device 1 in FIG. 1 has the three temperature sensors 19. The controller 80 is used to control the whole refrigeration cycle device 100. The controller 80 is, for example, a microcomputer or other processors. The controller 80, for example, controls parts of each of the refrigerant circuit 11, such as a compressor 12 and an expansion valve 16, and the heat medium sending device 52 and other devices for the heat medium channel 50 based on detection values or figures detected with the temperature sensors 19. The controller 80 is able to determine a frequency of mains electric power. The controller 80 sets an upper limit on a capacity of the compressor 12 in response to the frequency of the mains electric power. For instance, the controller sets an upper limit on the capacity of the compressor 12 to allow the heat source device 1 to display a cooling capacity of 100 kW when the frequency of the mains electric power is 50 Hz and alters the upper limit on the capacity of the compressor 12 to allow the heat source device 1 to display a cooling capacity of 120 kW when the frequency of the mains electric power is 60 Hz. The controller 80 sets an upper limit on the capacity of the compressor 12 in response to the frequency of the mains electric power and thus helps improve versatility of the heat source device 1.

The heat source device 1 has a first refrigerant circuit 11a, a second refrigerant circuit 11b, a third refrigerant circuit 11c, and a fourth refrigerant circuit 11d. A heat source device 1 in an example of the present embodiment may have three or more refrigerant circuits 11, although the heat source device 1 in FIG. 1 has the four refrigerant circuits 11.

The first refrigerant circuit 11a is formed such that a first compressor 12a, a first heat-source heat exchanger 14a, a first expansion valve 16a, and a first heat-medium heat exchanger 18-1 are connected annularly together by a first refrigerant pipe 17a. In FIG. 1, only the first refrigerant circuit 11a is connected to the first heat-medium heat exchanger 18-1, for example. However, two or more refrigerant circuits 11 may be connected in parallel to the first heat-medium heat exchanger 18-1. A first fan 15a is disposed near the first heat-source heat exchanger 14a to send air to the first heat-source heat exchanger 14a.

The second refrigerant circuit 11b is formed such that a second compressor 12b, a second heat-source heat exchanger 14b, a second expansion valve 16b, and a second heat-medium heat exchanger 18-2 are connected annularly together by a second refrigerant pipe 17b. A second fan 15b is disposed near the second heat-source heat exchanger 14b to send air to the second heat-source heat exchanger 14b.

The third refrigerant circuit 11c is formed such that a third compressor 12c, a third heat-source heat exchanger 14c, a third expansion valve 16c, and the second heat-medium heat exchanger 18-2 are connected annularly together by a third refrigerant pipe 17c. A third fan 15c is disposed near the third heat-source heat exchanger 14c to send air to the third heat-source heat exchanger 14c.

In FIG. 1, the second refrigerant circuit 11b and the third refrigerant circuit 11c are connected in parallel to the second heat-medium heat exchanger 18-2, for example. However, three or more refrigerant circuits 11 may be connected in parallel to the second heat-medium heat exchanger 18-2. In FIG. 1, the second fan 15b is disposed near the second heat-source heat exchanger 14b and the third fan 15c is disposed near the third heat-source heat exchanger 14c, for example. However, one of the second fan 15b and the third fan 15c may be omitted. In other words, one of the second and the third fans 15b and 15c may be omitted such that the second fan 15b or the third fan 15c is configured to send air to both the second and the third heat-source heat exchangers 14b and 14c. The fan 15 may be shared between the heat-source heat exchangers to reduce the number of parts of the heat source device 1.

The fourth refrigerant circuit 11d is formed such that a fourth compressor 12d, a fourth heat-source heat exchanger 14d, a fourth expansion valve 16d, and a third heat-medium heat exchanger 18-3 are connected annularly together by a fourth refrigerant pipe 17d. In FIG. 1, only the fourth refrigerant circuit 11d is connected to the third heat-medium heat exchanger 18-3, for example. However, two or more refrigerant circuits 11 may be connected in parallel to the third heat-medium heat exchanger 18-3. A fourth fan 15d is disposed near the fourth heat-source heat exchanger 14d to send air to the fourth heat-source heat exchanger 14d.

In the present embodiment, to facilitate understanding of descriptions, the first refrigerant circuit 11a, the second refrigerant circuit 11b, the third refrigerant circuit 11c, and the fourth refrigerant circuit 11d will be collectively referred to as the refrigerant circuit 11 unless there is a particular need to distinguish among these refrigerant circuits. The first compressor 12a, the second compressor 12b, the third compressor 12c, and the fourth compressor 12d will be collectively referred to as the compressor 12 unless there is a particular need to distinguish among these compressors. The first heat-source heat exchanger 14a, the second heat-source heat exchanger 14b, the third heat-source heat exchanger 14c, and the fourth heat-source heat exchanger 14d will be collectively referred to as the heat-source heat exchanger 14 unless there is a particular need to distinguish among these heat-source heat exchangers. The first expansion valve 16a, the second expansion valve 16b, the third expansion valve 16c, and the fourth expansion valve 16d will be collectively referred to as the expansion valve 16 unless there is a particular need to distinguish among these expansion valves. The first refrigerant pipe 17a, the second refrigerant pipe 17b, the third refrigerant pipe 17c, and the fourth refrigerant pipe 17d will be collectively referred to as the refrigerant pipe 17 unless there is a particular need to distinguish among these refrigerant pipes. The first fan 15a, the second fan 15b, the third fan 15c, and the fourth fan 15d will be collectively referred to as the fan 15 unless there is a particular need to distinguish among these fans. The first heat-medium heat exchanger 18-1, the second heat-medium heat exchanger 18-2, and the third heat-medium heat exchanger 18-3 will be collectively referred to as the heat-medium heat exchanger 18 unless there is a particular need to distinguish among these heat-medium heat exchangers. The first temperature sensor 19-1, the second temperature sensor 19-2, and the third temperature sensor 19-3 will be collectively referred to as the temperature sensor 19 unless there is a particular need to distinguish among these temperature sensors.

The refrigerant circuit 11 is a circuit through which refrigerant circulates. The refrigerant used in the refrigerant circuit 11 is not particularly limited. The refrigerant is, for example, a refrigerant with a low global warming potential (GWP), such as R410A or R32, propane or another natural refrigerant, or a mixed refrigerant containing at least one of such substances. The refrigerants sealed in two or more of the plurality of refrigerant circuits 11 may be different from each other. In the present embodiment, the plurality of refrigerant circuits 11 is independent of each other, for example. Thus, if an abnormality occurs, for example, in one of the refrigerant circuits 11, the system stops the abnormal refrigerant circuit 11 and enables the heat source device 1 to operate using the other normal refrigerant circuits 11.

Preferably, the refrigerant circuits 11 are each provided with a single compressor 12, although the refrigerant circuits may each be provided with a plurality of compressors 12. The refrigerant circuits 11 each provided with a single compressor 12 contribute to downsizing of each of the refrigerant circuits 11. The downsized refrigerant circuit 11 can reduce a decrease in quantity of refrigerating machine oil in the compressor 12. The downsized refrigerant circuit 11 allows the refrigerant pipe 17 to be made small in diameter. The refrigerant pipe 17 that is made small in diameter helps reduce the cost of the refrigerant pipe 17 and inhibits flow velocity of the refrigerant from decreasing. Inhibition of a decrease in the flow velocity of the refrigerant allows the compressor 12 to operate at a reduced capacity. With the refrigerant circuits 11 each provided with a single compressor 12, the system can freely control the capacity of each of the compressors 12 and thus enables the heat source device 1 to finely control temperature.

The compressor 12 compresses the suctioned refrigerant and discharges the refrigerant in a state of high temperature and high pressure. The compressor 12 is, for example, an inverter compressor that is controlled with an inverter and can freely change operating frequency to vary capacity (an amount of the refrigerant sent out per unit time. For instance, when temperature of the heat medium approaches a target temperature, the compressor 12 lowers its operating frequency to operate at a reduced capacity. The compressor 12 may be a constant-speed compressor that operates at a constant operating frequency.

The heat-source heat exchanger 14 is, for example, an air heat exchanger that allows the refrigerant to exchange heat with air and a finned tube heat exchanger made up of a fin and a tube. The heat-source heat exchanger 14 may be a plate heat exchanger used to exchange heat between the refrigerant and a heat medium. The fan 15 sends air to the heat-source heat exchanger 14 to facilitate exchange of heat between the refrigerant and the air. The expansion valve 16 is used to expand the refrigerant. The expansion valve 16 is an electronic expansion valve, a thermostatic expansion valve, or another similar valve that allows adjustment of an opening degree, for example, but may be made of a material such as a capillary tube that does not allow adjustment of an opening degree.

The heat-medium heat exchanger 18 is used to exchange heat between the refrigerant in the refrigerant circuit 11 and the heat medium in the heat medium channel 50. The heat-medium heat exchanger 18 is, for example, a plate heat exchanger. A heat source device 1 in an example of the present embodiment may have two or more heat-medium heat exchangers 18, although the heat source device 1 in FIG. 1 has the three heat-medium heat exchangers 18. The first heat-medium heat exchanger 18-1, the third heat-medium heat exchanger 18-3, and the second heat-medium heat exchanger 18-2 are connected in series in this order.

Only the single refrigerant circuit 11 is connected to each of the first heat-medium heat exchanger 18-1 and the third heat-medium heat exchanger 18-3. As shown in FIG. 2, the first and the third heat-medium heat exchangers 18-1 and 18-3 each include heat-medium flow paths 180 and refrigerant flow paths 181 that are alternately formed, for example. The heat medium flows through the heat-medium flow paths 180, and the refrigerant flows through the refrigerant flow paths 181. The flow paths of each of the first and the third heat-medium heat exchangers 18-1 and 18-3 are formed such that the heat medium and the refrigerant flow in a counter current manner in opposite directions. This configuration enables efficient heat exchange. In the first and the third heat-medium heat exchangers 18-1 and 18-3, the refrigerant flow paths 181, through which the refrigerant flows, are formed inside the heat-medium flow paths 180, through which the heat medium flows, such that the heat-medium flow paths 180 are on an outermost side. This configuration inhibits heat of the refrigerant from being removed by the air and thus allows the heat of the refrigerant to be efficiently transferred to the heat medium.

As shown in FIG. 1, the two refrigerant circuits 11 are connected to the second heat-medium heat exchanger 18-2. In the second heat-medium heat exchanger 18-2, as shown in FIG. 3, a heat-medium flow path 182 through which the heat medium flows, a refrigerant flow path 183 through which refrigerant A flows, a heat-medium flow path 182 through which the heat medium flows, and a refrigerant flow path 184 through which refrigerant B flows are formed in this order. The refrigerant flow paths 183 are formed for one of the two refrigerant circuits 11, and the refrigerant flow paths 184 are formed for the other of the two refrigerant circuits 11. The heat-medium flow path 182 is put between the refrigerant flow path 183 for the one of the two refrigerant circuits 11 and the refrigerant flow path 184 for the other refrigerant circuit 11. The flow paths of the second heat-medium heat exchanger 18-2 are formed such that the heat medium and the refrigerant flow in a counter current manner in opposite directions. This configuration enables efficient heat exchange. In the second heat-medium heat exchanger 18-2, the refrigerant flow paths 183 and 184, through which the respective refrigerant A and B flow, are formed inside the heat-medium flow paths 182, through which the heat medium flows, such that the heat-medium flow paths 182 are on an outermost side. This configuration inhibits heat of the refrigerant from being removed by the air and thus allows the heat of the refrigerant to be efficiently transferred to the heat medium.

With reference to FIG. 1, operation of the heat medium channel 50 will be described. The heat medium sending device 52 operates to allow the heat medium to flow through the heat medium channel 50. The heat medium flows into the heat source device 1 from the inflow port 53, exchanges heat with the refrigerant at the heat-medium heat exchanger 18, and flows out of the heat source device 1 from the outflow port 55. Specifically, the heat medium flowing into the heat source device 1 from the inflow port 53 exchanges heat with the refrigerant for the first refrigerant circuit 11a at the first heat-medium heat exchanger 18-1. The heat medium that has exchanged heat at the first heat-medium heat exchanger 18-1 exchanges heat with the refrigerant for the fourth refrigerant circuit 11d at the third heat-medium heat exchanger 18-3. The heat medium that has exchanged heat at the third heat-medium heat exchanger 18-3 exchanges heat with the refrigerant for the second refrigerant circuit 11b and the refrigerant for the third refrigerant circuit 11c at the second heat-medium heat exchanger 18-2. The heat medium that has exchanged heat at the second heat-medium heat exchanger 18-2 flows out of the heat source device 1 from the outflow port 55. The heat medium flowing out from the outflow port 55 flows into the load device 54 to exchange heat with the air at the load device 54.

Operation of the refrigerant circuit 11 will be described. The refrigerant that is compressed by the compressor 12 to have high temperature and high pressure rejects heat while condensing at the heat-source heat exchanger 14. The refrigerant that has condensed at the heat-source heat exchanger 14 expands by the expansion valve 16. The refrigerant that has expanded by the expansion valve 16 removes heat from the heat medium while evaporating at the heat-medium heat exchanger 18 and cools the heat medium. The refrigerant that has evaporated at the heat-medium heat exchanger 18 is suctioned by the compressor 12 and is again compressed.

An example of operation of the refrigeration cycle device 100 will be described. For instance, a heat medium at 7 degrees Celsius flows into the load device 54. At the load device 54, the heat medium exchanges heat with air in a room and rises to 12 degrees Celsius, for example, while cooling the room. The heat medium flowing out of the load device 54 is cooled by the first heat-medium heat exchanger 18-1, to which the first refrigerant circuit 11a is connected, and falls to 10.75 degrees Celsius, for example, in temperature. The heat medium that has been cooled by the first heat-medium heat exchanger 18-1 is cooled by the third heat-medium heat exchanger 18-3, to which the fourth refrigerant circuit 11d is connected, and falls to 9.5 degrees Celsius, for example, in temperature. The heat medium that has been cooled by the third heat-medium heat exchanger 18-3 is cooled by the second heat-medium heat exchanger 18-2, to which the second and the third refrigerant circuits 11b and 11c are connected, and falls to 7 degrees Celsius, for example, in temperature. The heat medium that has been cooled by the second heat-medium heat exchanger 18-2 and fallen to 7 degrees Celsius, for example, in temperature flows into the load device 54 again to exchange heat with air in the room. As described above, in the present embodiment, the first heat-medium heat exchanger 18-1, the third heat-medium heat exchanger 18-3, and the second heat-medium heat exchanger 18-2 are connected in series in this order to allow the temperature of the heat medium to change in stages, for example. This configuration allows a substantial difference in temperature between the refrigerant and the heat medium at places near areas of the heat-medium heat exchangers 18 where the heat medium flows out to allow the refrigerant and the heat medium to exchange heat with each other. By making a substantial difference in temperature between the refrigerant and the heat medium at the places near areas of the heat-medium heat exchangers 18 where the heat medium flows out to provide heat exchange, the refrigeration cycle device enables the heat-medium heat exchangers 18 to cool the heat medium efficiently. Preferably, the first heat-medium heat exchanger 18-1, the third heat-medium heat exchanger 18-3, and the second heat-medium heat exchanger 18-2 have respective target evaporating temperatures that descend in this order, for example. The number of heat-medium heat exchangers 18 connected in series may be increased. This provides an increase in average of evaporating temperatures set for the heat-medium heat exchangers 18 and thus contributes to a reduction in power consumption.

When the temperature in the air-conditioned space approaches a target temperature, for example, a load on the load device 54 decreases. When the load on the load device 54 is light, the refrigeration cycle device can reduce capacity of the heat source device 1 to allow the heat source device 1 to operate on low power consumption. In the present embodiment, when the load on the load device 54 is light, the system reduces the number of refrigerant circuits 11 in operation and thereby reduces the capacity of the heat source device 1, for example. To operate the refrigerant circuit 11, the compressor 12 is operated. To stop operation of the refrigerant circuit 11, operation of the compressor 12 is stopped.

To stop operation of one of the first, second, third, and fourth refrigerant circuits 11a, 11b, 11c, and 11d, for example, the operation of one of the first and the fourth refrigerant circuits 11a and 11d is stopped. The second and the third refrigerant circuits 11b and 11c are connected to the second heat-medium heat exchanger 18-2. Hence, when one of the second and the third refrigerant circuits 11b and 11c stops operation, the heat of the refrigerant in the refrigerant circuit 11 in operation is removed by the refrigerant in the refrigerant circuit 11 in non-operation. Moreover, when one of the second and the third refrigerant circuits 11b and 11c stops operation, a heat transfer area through which the heat medium removes heat from the refrigerant circuit 11 decreases in the second heat-medium heat exchanger 18-2 due to presence of the refrigerant circuit 11 in non-operation. Thus, when one of the second and the third refrigerant circuits 11b and 11c stops operation, heat exchange efficiency of the second heat-medium heat exchanger 18-2 decreases.

Meanwhile, only the first refrigerant circuit 11a is connected to the first heat-medium heat exchanger 18-1, and only the fourth refrigerant circuit 11d is connected to the third heat-medium heat exchanger 18-3. As a result, the refrigeration cycle device inhibits heat exchange efficiency of the heat source device 1 from decreasing when one of the first and the fourth refrigerant circuits 11a and 11d stops operation as compared to a case in which one of the second and the third refrigerant circuits 11b and 11c stops operation.

As described above, to stop operation of one of the plurality of refrigerant circuits 11, the heat source device 1 stops operation of one of the first and the fourth refrigerant circuits 11a and 11d and thereby inhibits a decrease in heat exchange efficiency. Inhibition of a decrease in heat exchange efficiency contributes to a reduction in power consumed by the heat source device 1.

To stop operation of one of the first and the fourth refrigerant circuits 11a and 11d, it is preferred that operation of the first refrigerant circuit 11a be preferentially stopped. The first heat-medium heat exchanger 18-1, to which the first refrigerant circuit 11a is connected, is disposed upstream of the third heat-medium heat exchanger 18-3, to which the fourth refrigerant circuit 11d is connected, in the heat medium channel 50. Thus, when the first refrigerant circuit 11a operates and the fourth refrigerant circuit 11d stops operation, the third heat-medium heat exchanger 18-3 removes heat from the heat medium that has exchanged heat at the first heat-medium heat exchanger 18-1. To stop operation of one of the first and the fourth refrigerant circuits 11a and 11d, the refrigerant circuits 11 may alternate between operating and stopping operation, for example. This can equalize operating hours for the compressors 12 and other elements that make up the respective refrigerant circuits 11 and thus prolong life of the heat source device 1.

To stop operation of two of the first, second, third, and fourth refrigerant circuits 11a, 11b, 11c, and 11d, for example, the operation of the second and the third refrigerant circuits 11b and 11c is stopped. The first heat-medium heat exchanger 18-1, to which the first refrigerant circuit 11a is connected, and the third heat-medium heat exchanger 18-3, to which the fourth refrigerant circuit 11d is connected, are connected in series with the heat medium channel 50. The plurality of heat-medium heat exchangers 18 connected in series with the heat medium channel 50 performs heat exchange. This configuration allows a substantial difference in temperature between the refrigerant and the heat medium at places near areas of the heat-medium heat exchangers 18 where the heat medium flows out to allow the refrigerant and the heat medium to exchange heat with each other. By making a substantial difference in temperature between the refrigerant and the heat medium at the places near areas of the heat-medium heat exchangers 18 where the heat medium flows out to provide heat exchange, the refrigeration cycle device enables the heat-medium heat exchangers 18 to perform heat exchange effectively using the heat transfer area and thus allows the refrigerant and the heat medium to efficiently exchange heat with each other.

Since the second and the third refrigerant circuits 11b and 11c are connected in parallel, the difference in temperature between the refrigerant and the heat medium needs to be increased at a place near an area of the second heat-medium heat exchanger 18-2 where the heat medium flows in, if the first and the fourth refrigerant circuits 11a and 11d stop operation and the second and the third refrigerant circuits 11b and 11c operate. This necessitates lowering evaporating temperatures for the second and the third refrigerant circuits 11b and 11c, resulting in increased power consumption.

As described above, when one of the second and the third refrigerant circuits 11b and 11c stops operation, the heat exchange efficiency of the second heat-medium heat exchanger 18-2 decreases. Thus, the heat source device 1 stops operation of the second and the third refrigerant circuits 11b and 11c and thereby inhibits a decrease in heat exchange efficiency.

An amount of heat exchange performed by the second heat-medium heat exchanger 18-2 is large since the second and the third refrigerant circuits 11b and 11c are connected to the second heat-medium heat exchanger. Thus, when the first and the fourth refrigerant circuits 11a and 11d stop operation and the second and the third refrigerant circuits 11b and 11c operate, there is a possibility that the cooling capacity at the second heat-medium heat exchanger 18-2 becomes excessive, causing the heat medium to freeze. For instance, when the load on the load device 54 is light and a flow rate of the heat medium falls, or in such a case, the cooling capacity becomes excessive.

Meanwhile, when the second and the third refrigerant circuits 11b and 11c stop operation and the first and the fourth refrigerant circuits 11a and 11d operate, the first temperature sensor 19-1 detects temperature of the heat medium flowing out from the first heat-medium heat exchanger 18-1. As a result, when the temperature detected with the first temperature sensor 19-1 falls, the system can increase a target temperature for the fourth refrigerant circuit 11d and thereby inhibit the heat medium from freezing, for example. In addition, an amount of heat exchange performed by the third heat-medium heat exchanger 18-3 is smaller than that of the second heat-medium heat exchanger 18-2 since only the fourth refrigerant circuit 11d is connected to the third heat-medium heat exchanger. Thus, by stopping operation of the second and the third refrigerant circuits 11b and 11c and operating the first and the fourth refrigerant circuits 11a and 11d, the system can reduce the possibility of freezing the heat medium.

To stop operation of three of the first, second, third, and fourth refrigerant circuits 11a, 11b, 11c, and 11d, for example, the operation of the second and the third refrigerant circuits 11b and 11c and the operation of the first refrigerant circuit 11a or the fourth refrigerant circuit 11d are stopped. As described above, when one of the second and the third refrigerant circuits 11b and 11c stops operation, the heat exchange efficiency of the second heat-medium heat exchanger 18-2 decreases. Thus, the heat source device 1 stops operation of the second and the third refrigerant circuits 11b and 11c and thereby inhibits a decrease in heat exchange efficiency.

To stop operation of one of the first and the fourth refrigerant circuits 11a and 11d, it is preferred that operation of the first refrigerant circuit 11a be preferentially stopped. The first heat-medium heat exchanger 18-1, to which the first refrigerant circuit 11a is connected, is disposed upstream of the third heat-medium heat exchanger 18-3, to which the fourth refrigerant circuit 11d is connected, in the heat medium channel 50. Thus, when the first refrigerant circuit 11a operates and the fourth refrigerant circuit 11d stops operation, the third heat-medium heat exchanger 18-3 removes heat from the heat medium that has exchanged heat at the first heat-medium heat exchanger 18-1. To stop operation of one of the first and the fourth refrigerant circuits 11a and 11d, the refrigerant circuits 11 may alternate between operating and stopping operation, for example. This can equalize operating hours for the compressors 12 and other elements that make up the respective refrigerant circuits 11 and thus prolong life of the heat source device 1.

The present embodiment should not be limited to the examples described above.

For instance, a heat source device 1 includes a heat medium channel 50 through which a heat medium flows, a plurality of refrigerant circuits 11 through which refrigerant circulates, and a plurality of heat-medium heat exchangers 18 to exchange heat between the heat medium in the heat medium channel 50 and the refrigerant in the refrigerant circuits 11. Preferably, the plurality of heat-medium heat exchangers 18 include a first heat-medium heat exchanger 18-1 to which at least one of the refrigerant circuits 11 is connected and a second heat-medium heat exchanger 18-2 to which a greater number of the refrigerant circuits 11 are connected than to the first heat-medium heat exchanger 18-1. When the number of refrigerant circuits 11 in non-operation that a refrigeration cycle device decreases to reduce capacity of the heat source device 1 is, for example, less than the number of the refrigerant circuits 11 connected to the second heat-medium heat exchanger 18-2, the refrigeration cycle device preferentially stops the at least one refrigerant circuit 11 connected to the first heat-medium heat exchanger 18-1. When the number of the refrigerant circuits 11 in non-operation that the refrigeration cycle device decreases to reduce the capacity of the heat source device 1 is, for example, greater than or equal to the number of the refrigerant circuits 11 connected to the second heat-medium heat exchanger 18-2, the refrigeration cycle device preferentially stops the refrigerant circuits 11 connected to the second heat-medium heat exchanger 18-2. As described above, the numbers of the refrigerant circuits 11 connected to the plurality of respective heat-medium heat exchangers 18 are different from each other and thus the heat source device 1 selectively stops operation of the refrigerant circuits 11 to thereby reduce its capacity and inhibit a decrease in heat exchange efficiency.

For instance, it is preferred that the first heat-medium heat exchanger 18-1 and the second heat-medium heat exchanger 18-2 be connected in series with the heat medium channel 50, although the first heat-medium heat exchanger 18-1 and the second heat-medium heat exchanger 18-2 may be connected in parallel with the heat medium channel 50. A configuration in which the first and the second heat-medium heat exchangers 18-1 and 18-2 are connected in series allows a substantial difference in temperature between the refrigerant and the heat medium at a place near an area of the first heat-medium heat exchanger 18-1 where the heat medium flows out to allow the refrigerant and the heat medium to exchange heat with each other. This configuration also allows a substantial difference in temperature between the refrigerant and the heat medium at a place near an area of the third heat-medium heat exchanger 18-3 where the heat medium flows out to allow the refrigerant and the heat medium to exchange heat with each other. By making a substantial difference in temperature between the refrigerant and the heat medium at the places near areas of the heat-medium heat exchangers 18 where the heat medium flows out to provide heat exchange, the refrigeration cycle device enables the heat-medium heat exchangers 18 to cause heat exchange to be performed efficiently between the refrigerant and the heat medium.

For instance, it is preferred that the first heat-medium heat exchanger 18-1 be disposed downstream of the second heat-medium heat exchanger 18-2 in the heat medium channel 50.

As described above, when the number of the refrigerant circuits 11 in non-operation is, for example, greater than or equal to the number of the refrigerant circuits 11 connected to the second heat-medium heat exchanger 18-2, the refrigeration cycle device preferentially stops the refrigerant circuits 11 connected to the second heat-medium heat exchanger 18-2. When the refrigerant circuit connected to the first heat-medium heat exchanger 18-1 operates while the operation of the refrigerant circuits 11 connected to the second heat-medium heat exchanger 18-2 stops, the heat of the heat medium that has exchanged heat at the first heat-medium heat exchanger 18-1 is not removed by the refrigerant in the second heat-medium heat exchanger 18-2, with proviso that the first heat-medium heat exchanger 18-1 is disposed downstream of the second heat-medium heat exchanger 18-2 in the heat medium channel 50. The number of the refrigerant circuits 11 connected to the second heat-medium heat exchanger 18-2 is greater than that for the first heat-medium heat exchanger 18-1. Thus, the configuration in which the first heat-medium heat exchanger 18-1 is disposed downstream of the second heat-medium heat exchanger 18-2 in the heat medium channel 50 can inhibit the heat exchange efficiency from decreasing in response to a suspension of operation of the refrigerant circuits 11 connected to the second heat-medium heat exchanger 18-2.

The amount of heat exchange performed by the second heat-medium heat exchanger 18-2 is larger than that performed by the first heat-medium heat exchanger 18-1 since the number of the refrigerant circuits 11 connected to the second heat-medium heat exchanger 18-2 is greater than that for the first heat-medium heat exchanger 18-1. The heat source device 1 can, for example, cool the heat medium with the evaporating temperature for the second heat-medium heat exchanger 18-2 being set higher than the evaporating temperature for the first heat-medium heat exchanger 18-1, with proviso that the second heat-medium heat exchanger 18-2 is disposed upstream of the first heat-medium heat exchanger 18-1 in the heat medium channel 50. The refrigeration cycle device can set an increased evaporating temperature for the second heat-medium heat exchanger 18-2, which performs a large amount of heat exchange, to reduce the possibility that the heat medium freezes.

For instance, it is preferred that the plurality of heat-medium heat exchangers 18 further include a third heat-medium heat exchanger 18-3 to which a fewer number of the refrigerant circuits 11 are connected than to the second heat-medium heat exchanger 18-2. The refrigeration cycle device includes the first heat-medium heat exchanger 18-1, the second heat-medium heat exchanger 18-2, and the third heat-medium heat exchanger 18-3 and is thus able to finely adjust the capacity of the heat source device 1. Preferably, the third heat-medium heat exchanger 18-3 is disposed downstream of the second heat-medium heat exchanger 18-2 in the heat medium channel 50, for example. As in the configuration in which the first heat-medium heat exchanger 18-1 is disposed downstream of the second heat-medium heat exchanger 18-2, a configuration in which the third heat-medium heat exchanger 18-3 is disposed downstream of the second heat-medium heat exchanger 18-2 can reduce the possibility that the heat exchange efficiency of the heat source device 1 decreases and the possibility that the heat medium freezes. In a way similar to that described above, when the number of the refrigerant circuits 11 connected to the first heat-medium heat exchanger 18-1 is fewer than the number of the refrigerant circuits 11 connected to the third heat-medium heat exchanger 18-3, the first heat-medium heat exchanger 18-1 is preferably disposed downstream of the third heat-medium heat exchanger 18-3. In other words, when the heat source device includes the plurality of heat-medium heat exchangers 18 and the numbers of the refrigerant circuits 11 connected to the respective heat-medium heat exchangers 18 are different from each other, the heat-medium heat exchanger 18 to which the fewer number of the refrigerant circuits 11 are connected is preferably disposed downstream of the other heat-medium heat exchanger 18 in the heat medium channel 50.

Embodiment 2

Figure 4:
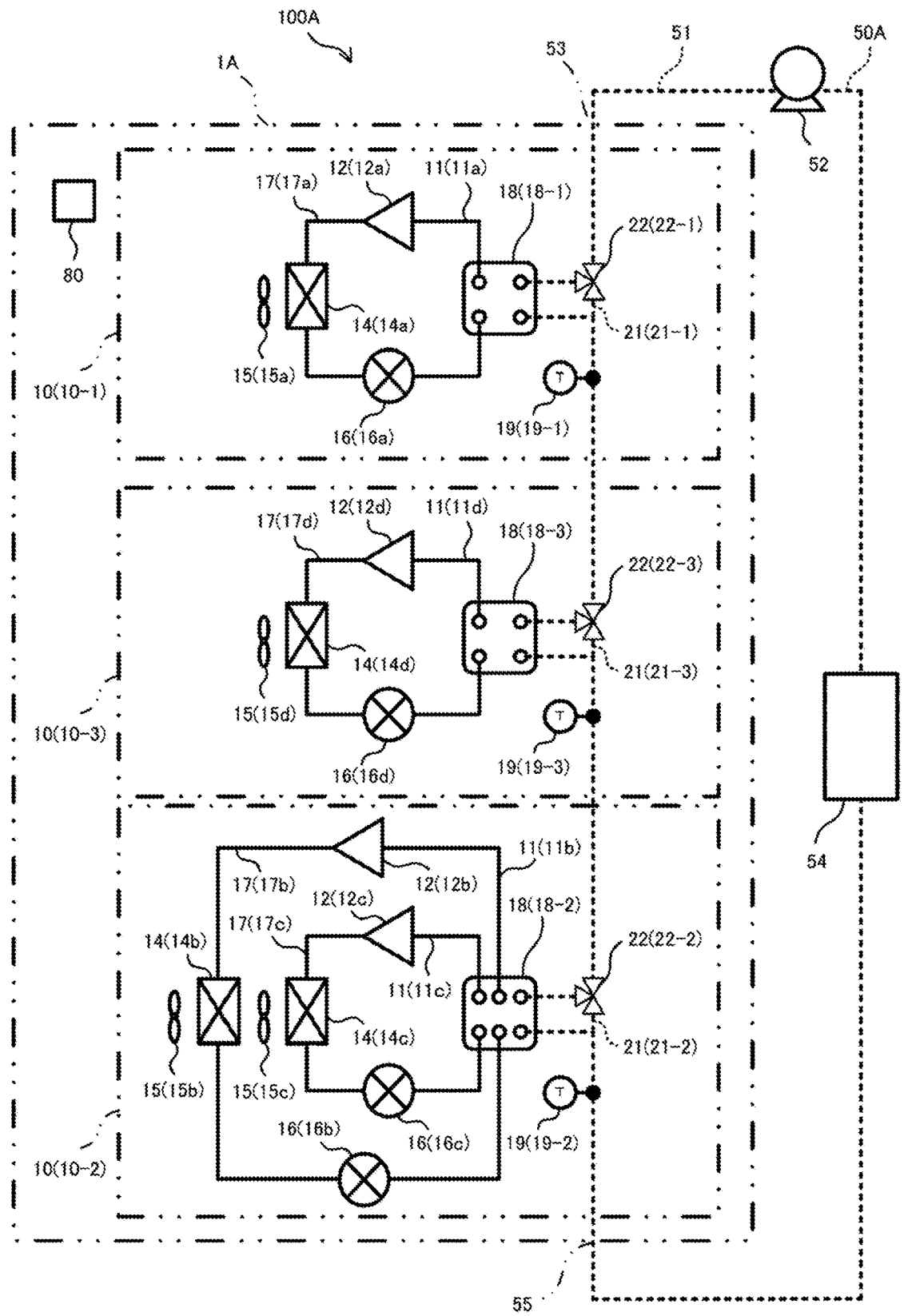
FIG. 4 illustrates an example of a refrigeration cycle device according to Embodiment 2 of the present disclosure.

FIG. 4 illustrates an example of a refrigeration cycle device according to Embodiment 2 of the present disclosure. In FIG. 4, components similar to those in FIG. 1 are denoted by identical reference numerals, and descriptions thereof will be omitted or simplified. In the present embodiment, as shown in FIG. 4, a heat source device 1A of a refrigeration cycle device 100A is formed such that a plurality of modular heat source units 10 is connected together by a heat medium pipe 51. The heat source device 1A includes a first heat source unit 10-1, a second heat source unit 10-2, and a third heat source unit 10-3. In the present embodiment, to facilitate understanding of descriptions, the first heat source unit 10-1, the second heat source unit 10-2, and the third heat source unit 10-3 will be collectively referred to as the heat source unit 10 unless there is a particular need to distinguish among these heat source units. The heat source device 1A may be a heat source device that includes two or more heat source units 10.

The heat source unit 10 accommodates one heat-medium heat exchanger 18 and a refrigerant circuit 11 connected to the one heat-medium heat exchanger 18. The first heat source unit 10-1 accommodates a first heat-medium heat exchanger 18-1 and a first refrigerant circuit 11a connected to the first heat-medium heat exchanger 18-1. The second heat source unit 10-2 accommodates a second heat-medium heat exchanger 18-2 and a second refrigerant circuit 11b and a third refrigerant circuit 11c that are connected to the second heat-medium heat exchanger 18-2. The third heat source unit 10-3 accommodates a third heat-medium heat exchanger 18-3 and a fourth refrigerant circuit 11d connected to the third heat-medium heat exchanger 18-3. The heat source units 10 each accommodate a fan 15 to send air to a heat-source heat exchanger 14 on the accommodated refrigerant circuit 11 and a temperature sensor 19 to detect temperature of a heat medium having passed through the accommodated heat-medium heat exchanger 18. As described above, the heat source device 1A is formed such that the plurality of modular heat source units 10 is connected together by the heat medium pipe 51. This configuration improves flexibility in installation of the heat source device 1A. Since the heat source device 1A has the heat-medium heat exchangers 18 and is large, the effect of an improvement in installation flexibility is noticeable. The heat source device 1A is made up of parts including the plurality of heat source units 10, and this enables standardization of the heat source units 10. The standardization of the components contributes to cost reduction. The heat source device 1A is made up of parts including the plurality of heat source units 10, and hence specifications of the heat source device 1A can be freely altered by only changing a combination of the heat source units 10.

In the present embodiment, the heat medium channel 50A has a bypass flow path 21. The bypass flow path 21 is disposed in parallel to the heat-medium heat exchanger 18. The heat medium channel 50A has a bypass control valve 22. The bypass control valve 22 is used to control a flow of the heat medium into the bypass flow path 21. The bypass control valve 22, for example, switches between flow paths to allow the heat medium to flow into either the heat-medium heat exchanger 18 or the bypass flow path 21. The bypass control valve 22 may be designed to adjust an amount of the heat medium flowing into the heat-medium heat exchanger 18 and an amount of the heat medium flowing into the bypass flow path 21. The bypass control valve 22 is, for example, a three-way valve, or may be at least one two-way valve. The bypass control valve 22 is, for example, controlled by the controller 80, or may be operated manually. In FIG. 4, the heat source device 1A, for example, includes a first bypass flow path 21-1 disposed in parallel to the first heat-medium heat exchanger 18-1, a first bypass control valve 22-1 to control a flow of the heat medium into the first bypass flow path 21-1, a second bypass flow path 21-2 disposed in parallel to the second heat-medium heat exchanger 18-2, a second bypass control valve 22-2 to control a flow of the heat medium into the second bypass flow path 21-2, a third bypass flow path 21-3 disposed in parallel to the third heat-medium heat exchanger 18-3, and a third bypass control valve 22-3 to control a flow of the heat medium into the third bypass flow path 21-3. In the present embodiment, to facilitate understanding of descriptions, the first bypass flow path 21-1, the second bypass flow path 21-2, and the third bypass flow path 21-3 will be collectively referred to as the bypass flow path 21 unless there is a particular need to distinguish among these bypass flow paths. The first bypass control valve 22-1, the second bypass control valve 22-2, and the third bypass control valve 22-3 will be collectively referred to as the bypass control valve 22 unless there is a particular need to distinguish among these bypass control valves.

In the present embodiment, when the load on the load device 54 is light, the system reduces the number of the refrigerant circuits 11 in operation to reduce the capacity of the heat source device 1 and allow the heat medium to flow into the bypass flow path 21 connected in parallel to the heat-medium heat exchanger 18 on the stopped refrigerant circuit 11, for example. By allowing the heat-medium to bypass the heat-medium heat exchanger 18 and flow into the bypass flow path 21, the system reduces resistance of the heat medium channel 50A and thus facilitates the flow of the heat medium. As a result, by allowing the heat-medium to bypass the heat-medium heat exchanger 18 and flow into the bypass flow path 21, the system can reduce power consumed by the heat medium sending device 52. For instance, when the refrigerant circuit 11 stops because of maintenance, a failure, or other reason, the system may allow the heat medium to flow into the bypass flow path 21. For instance, when the first refrigerant circuit 11a stops, the system allows the heat medium to bypass the first heat-medium heat exchanger 18-1 and flow into the first bypass flow path 21-1. When the second and the third refrigerant circuits 11b and 11c stop, the system allows the heat medium to bypass the second heat-medium heat exchanger 18-2 and flow into the second bypass flow path 21-2. When the fourth refrigerant circuit 11d stops, the system allows the heat medium to bypass the third heat-medium heat exchanger 18-3 and flow into the third bypass flow path 21-3.

The present embodiment should not be limited to the examples described above.

For instance, in FIG. 4, the bypass flow paths 21 and the bypass control valves 22 corresponding to the heat-medium heat exchangers 18 are provided. However, a bypass flow path 21 and a bypass control valve 22 corresponding to at least one of the plurality of heat-medium heat exchangers 18 may be provided.

Embodiment 3

Figure 5:
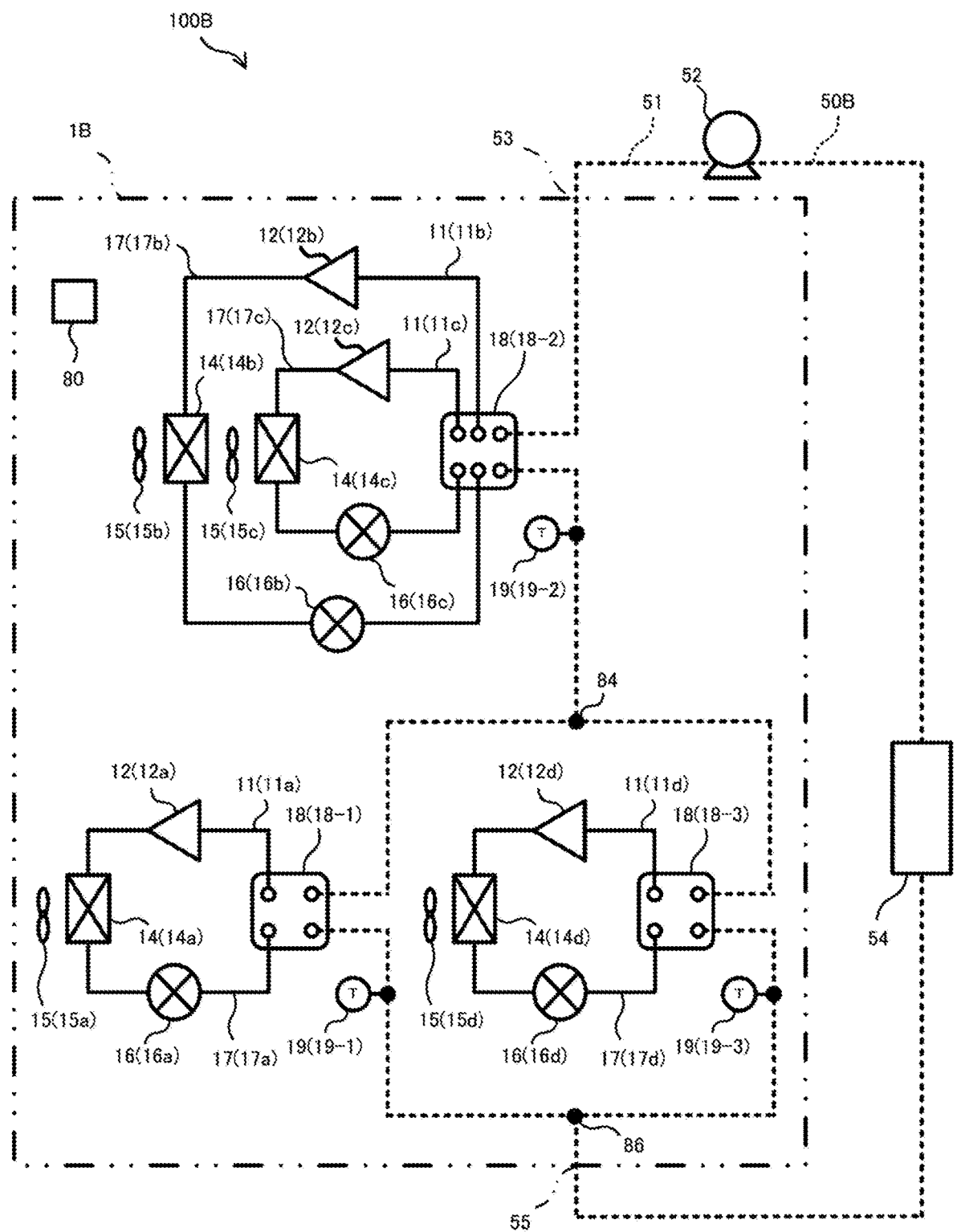
FIG. 5 illustrates an example of a refrigeration cycle device according to Embodiment 3 of the present disclosure.

FIG. 5 illustrates an example of a refrigeration cycle device according to Embodiment 3 of the present disclosure. In FIG. 5, components similar to those in FIG. 1 are denoted by identical reference numerals, and descriptions thereof will be omitted or simplified. In the present embodiment, as shown in FIG. 5, a heat source device 1B of a refrigeration cycle device 100B includes a first heat-medium heat exchanger 18-1 and a third heat-medium heat exchanger 18-3 that are connected in parallel with a heat medium channel 50B. A second heat-medium heat exchanger 18-2 is connected in series to the first and the third heat-medium heat exchangers 18-1 and 18-3 in the heat medium channel 50B. The second heat-medium heat exchanger 18-2 is disposed upstream of the first and the third heat-medium heat exchangers 18-1 and 18-3 in the heat medium channel 50B. The heat medium channel 50B has a branch 84 that is disposed downstream of the second heat-medium heat exchanger 18-2. The first and the third heat-medium heat exchangers 18-1 and 18-3, which are connected in parallel, are disposed downstream of the branch 84 of the heat medium channel 50B. The heat medium channel 50B has a junction 86 that is disposed downstream of the first and the third heat-medium heat exchangers 18-1 and 18-3. The branch 84 and the junction 86 are accommodated inside the heat source device 1B. The second heat-medium heat exchanger 18-2 may be disposed downstream of the first and the third heat-medium heat exchangers 18-1 and 18-3 in the heat medium channel 50B.

Operation of the heat medium channel 50B will be described. A heat medium sending device 52 operates to allow a heat medium to flow through the heat medium channel 50B. The heat medium that has exchanged heat with refrigerant for a second refrigerant circuit 11b and refrigerant for a third refrigerant circuit 11c at the second heat-medium heat exchanger 18-2 splits at the branch 84 into a portion of the heat medium that flows into the first heat-medium heat exchanger 18-1 and a portion of the heat medium that flows into the third heat-medium heat exchanger 18-3. The portion of the heat medium that has exchanged heat with refrigerant for a first refrigerant circuit 11a at the first heat-medium heat exchanger 18-1 and the portion of the heat medium that has exchanged heat with refrigerant for a fourth refrigerant circuit 11d at the third heat-medium heat exchanger 18-3 merge at the junction 86 and flow into a load device 54. The heat medium that has exchanged heat with air at the load device 54 flows into the second heat-medium heat exchanger 18-2. A split ratio of the portion of the heat medium flowing into the first heat-medium heat exchanger 18-1 to the portion of the heat medium flowing into the third heat-medium heat exchanger 18-3 is determined by factors such as resistance levels of pipes from the branch 84 to the junction 86 and can be set by parameters such as valve opening and closing or piping design. In the present embodiment, the split ratio is 1 to 1, for example.

An example of operation of the refrigeration cycle device 100B will now be described. For instance, a heat medium at 7 degrees Celsius flows into the load device 54. At the load device 54, the heat medium exchanges heat with air in a room and rises to 12 degrees Celsius, for example, while cooling the room. The heat medium flowing out of the load device 54 is cooled by the second heat-medium heat exchanger 18-2, to which the second and the third refrigerant circuits 11b and 11c are connected, and falls to 9.5 degrees Celsius, for example, in temperature. The heat medium that has been cooled by the second heat-medium heat exchanger 18-2 splits at the branch 84 into a portion of the heat medium that flows into the first heat-medium heat exchanger 18-1 and a portion of the heat medium that flows into the third heat-medium heat exchanger 18-3. The refrigerant cooled at the first heat-medium heat exchanger 18-1, to which the first refrigerant circuit 11a is connected, falls to 7 degrees Celsius, for example, in temperature. The refrigerant flowing into the third heat-medium heat exchanger 18-3, to which the fourth refrigerant circuit 11d is connected, falls to 7 degrees Celsius, for example, in temperature. The portion of the heat medium that has been cooled by the first heat-medium heat exchanger 18-1 and the portion of the heat medium that has been cooled by the third heat-medium heat exchanger 18-3 merge at the junction 86 and flow into the load device 54 again to exchange heat with air in the room. As described above, in the present embodiment, the second heat-medium heat exchanger 18-2 is connected in series to the first and the third heat-medium heat exchangers 18-1 and 18-3 to allow the temperature of the heat medium to change in stages, for example. This configuration allows a substantial difference in temperature between the refrigerant and the heat medium at places near areas of the heat-medium heat exchangers 18 where the heat medium flows out to allow the refrigerant and the heat medium to exchange heat with each other and thus enables efficient cooling of the heat medium. Preferably, target evaporating temperatures set for the first and the third heat-medium heat exchangers 18-1 and 18-3 are lower than a target evaporating temperature set for the second heat-medium heat exchanger 18-2, for example.

In the present embodiment, as described above, the first and the third heat-medium heat exchangers 18-1 and 18-3 are connected in parallel, for example. This allows a reduction in the amount of the heat medium flowing into each of the first and the third heat-medium heat exchangers 18-1 and 18-3. As a result, the system in the present embodiment, for example, can reduce resistance of the heat medium channel 50 and thus reduce power consumed by the heat medium sending device 52.

The system in the present embodiment, for example, can reduce the amount of the heat medium flowing into each of the first and the third heat-medium heat exchangers 18-1 and 18-3 and thus contributes to a reduction in diameter of heat medium pipes 51 for the paths on which the first and the third heat-medium heat exchangers 18-1 and 18-3 are disposed. A reduced diameter of the heat medium pipes 51 helps improve workability of the heat medium pipes 51 and reduce the cost of the heat medium pipes 51.

Embodiment 4

Figure 6:
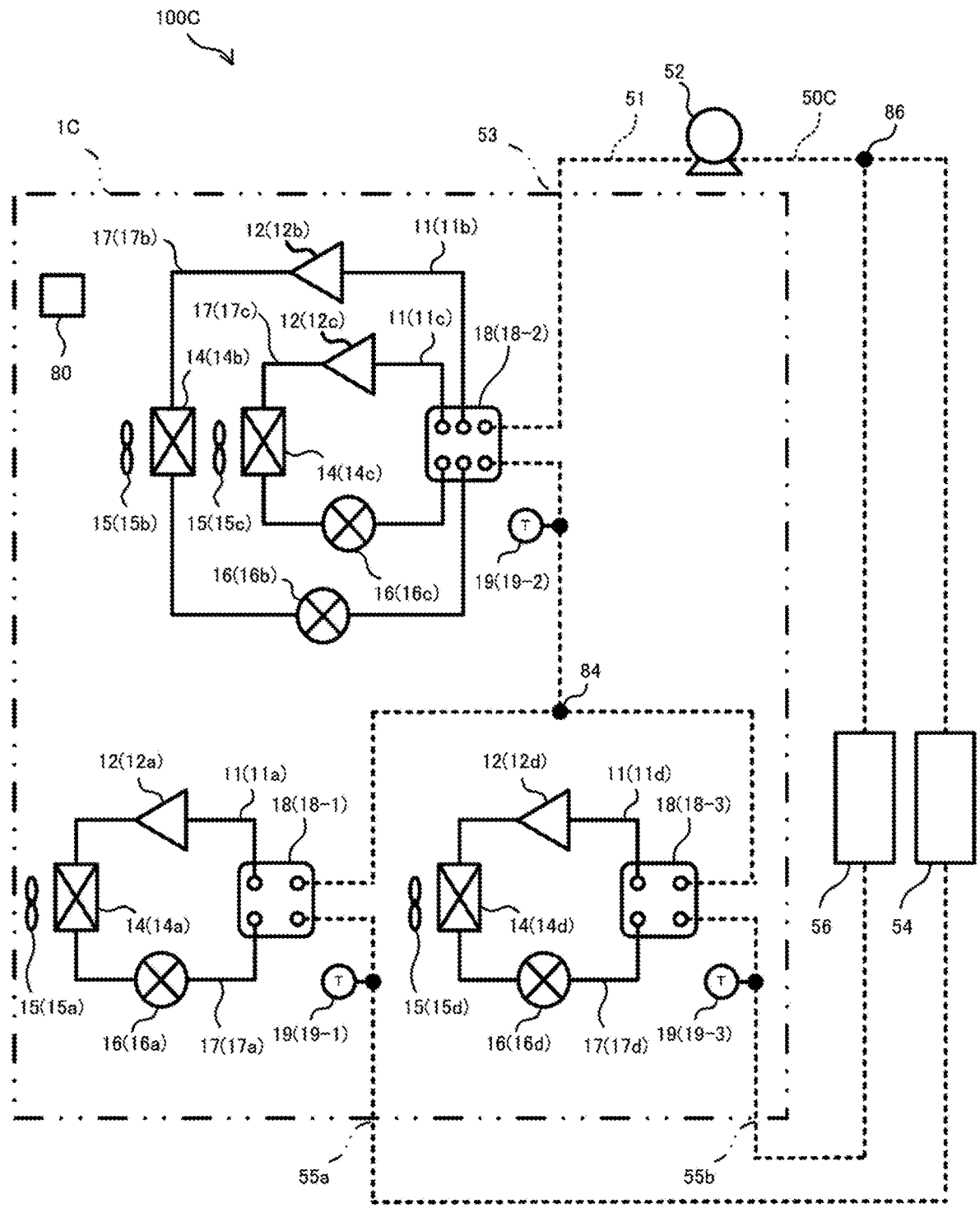
FIG. 6 illustrates an example of a refrigeration cycle device according to Embodiment 4 of the present disclosure.

FIG. 6 illustrates an example of a refrigeration cycle device according to Embodiment 4 of the present disclosure. In FIG. 6, components similar to those in FIG. 5 are denoted by identical reference numerals, and descriptions thereof will be omitted or simplified. As shown in FIG. 6, a refrigeration cycle device 100C of the present embodiment includes a load device 54 and a load device 56. In the present embodiment, the load device 54 is equivalent to a "first load device", and the load device 56 is equivalent to a "second load device". The load devices 54 and 56 are connected in parallel. A heat source device 1C has a first outflow port 55a that is disposed downstream of a first heat-medium heat exchanger 18-1 and a second outflow port 55b that is disposed downstream of a third heat-medium heat exchanger 18-3. A heat medium flowing out from the first outflow port 55a is supplied to the load device 54. The heat medium flowing out from the second outflow port 55b is supplied to the load device 56. A heat medium channel 50C has a junction 86 that is disposed downstream of both the load devices 54 and 56. The junction 86 is disposed outside the heat source device 1C. A heat medium sending device 52 is disposed downstream of the junction 86. Since the heat medium sending device 52 is disposed downstream of the junction 86, the load devices 54 and 56 can share the heat medium sending device 52. In the present embodiment, the heat source device 1C has the first outflow port 55a, from which the heat medium that has passed through the first heat-medium heat exchanger 18-1 flows out, and the second outflow port 55b, from which the heat medium that has passed through the third heat-medium heat exchanger 18-3 flows out, for example. Thus, a refrigeration cycle device 100C can be, for example, formed in such a way as to include the load device 54 connected to the first outflow port 55a and the load device 56 connected to the second outflow port 55b. For instance, the refrigeration cycle device 100C of the present embodiment may be applied to a case in which a load device 54 and a load device 56 use portions of a heat medium that have different temperatures.

Embodiment 5

Figure 7:
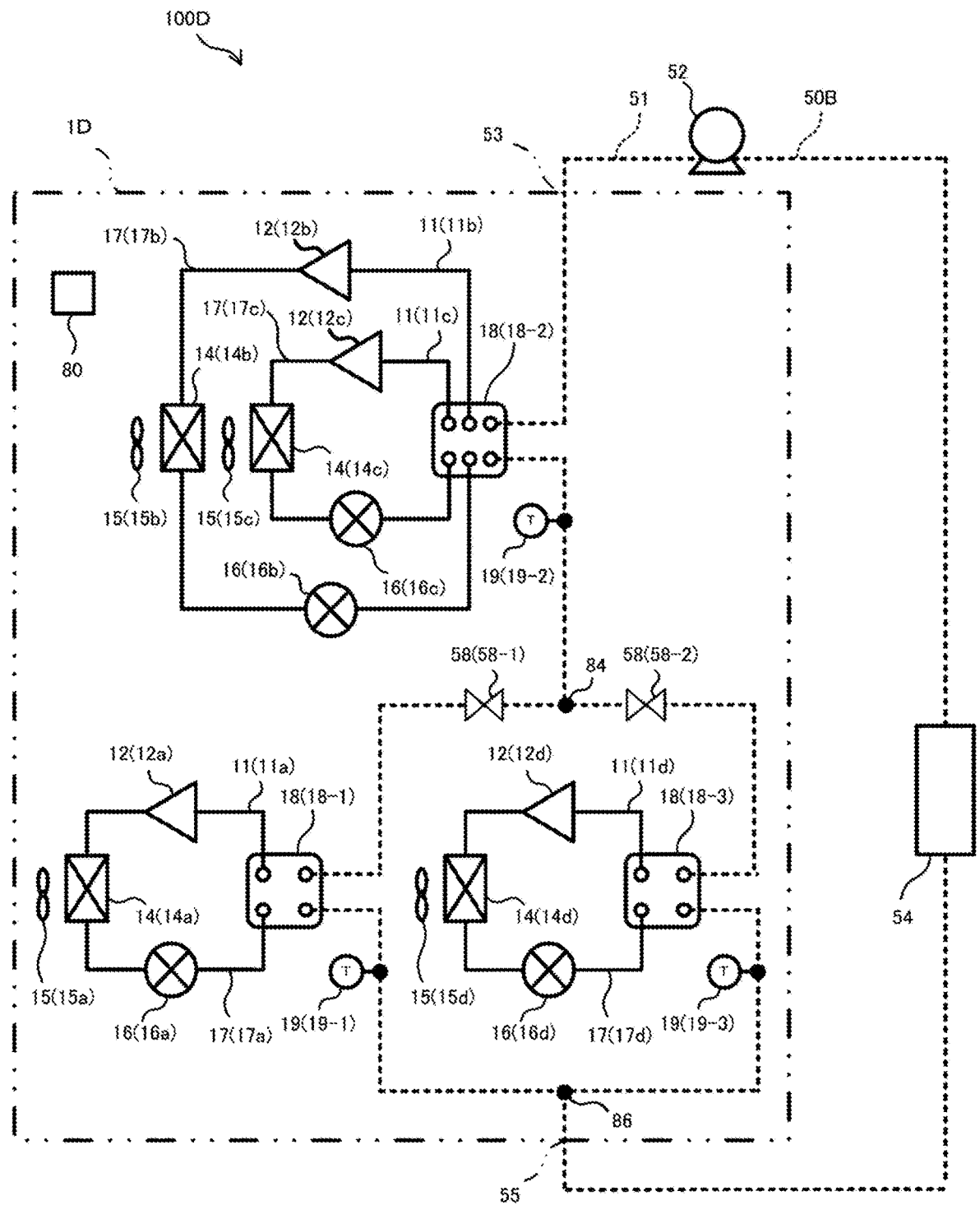
FIG. 7 illustrates an example of a refrigeration cycle device according to Embodiment 5 of the present disclosure.

FIG. 7 illustrates an example of a refrigeration cycle device according to Embodiment 5 of the present disclosure. In FIG. 7, components similar to those in FIG. 5 are denoted by identical reference numerals, and descriptions thereof will be omitted or simplified. In the present embodiment, a heat source device 1D of a refrigeration cycle device 100D includes an inflow control valve 58 disposed on a heat medium channel 50B, for example. The inflow control valve 58 is used to control a flow of a heat medium into a first heat-medium heat exchanger 18-1 or a third heat-medium heat exchanger 18-3. The inflow control valve 58 is, for example, controlled by a controller 80, or may be operated manually. The inflow control valve 58, for example, includes a first inflow control valve 58-1 to control a flow of the heat medium into the first heat-medium heat exchanger 18-1 and a second inflow control valve 58-2 to control a flow of the heat medium into the third heat-medium heat exchanger 18-3. The first and the second inflow control valves 58-1 and 58-2 are, for example, open-close valves designed to switch between opening and closing, or may be each a motor-operated valve designed to adjust an opening degree.

For instance, in response to a decrease in flow rate of the heat medium or a similar event, the cooling capacity may become excessive, causing the heat medium to freeze. To resolve this problem, when the cooling capacity is excessive, the system in the present embodiment, for example, closes one of the first and the second inflow control valves 58-1 and 58-2 and stops a refrigerant circuit 11 connected to the heat-medium heat exchanger 18 into which the heat medium does not flow. By allowing the heat medium to flow into one of the first and the third heat-medium heat exchangers 18-1 and 18-3, the system increases flow velocity of the heat medium flowing through the one heat-medium heat exchanger 18 and thus inhibits the heat medium from freezing. The first inflow control valve 58-1 or the second inflow control valve 58-2 may be omitted. However, the system includes both the first and the second inflow control valves 58-1 and 58-2 and thus can control a flow of the heat medium into each of the first and the third heat-medium heat exchangers 18-1 and 18-3. The system includes both the first and the second inflow control valves 58-1 and 58-2 and thus enables the refrigerant circuits 11 to alternate between operating and stopping operation, for example. This can equalize operating hours for compressors 12 and other elements that make up the respective refrigerant circuits 11. By equalizing operating hours for the elements that make up the respective refrigerant circuits 11, the system can prolong life of the heat source device 1. Moreover, if an abnormality occurs in a first refrigerant circuit 11a or a fourth refrigerant circuit 11d, the system can allow the heat source device 1 to operate while stopping the flow of the heat medium into the heat-medium heat exchanger 18 connected to the refrigerant circuit 11 in which the abnormality occurs.

The present disclosure should not be limited to the embodiments described above. Various modifications can be made to the embodiments within the scope of the present disclosure. In other words, in the embodiments described above, a configuration may be appropriately improved or at least some components may be replaced with other components. Furthermore, a structural component that is not particularly limited in disposition may be disposed at a place to fulfill a desired function, other than the disposition disclosed in the embodiments.

A structure of the heat source unit 10 in Embodiment 2 may be applied to Embodiment 1, Embodiment 3, Embodiment 4, or Embodiment 5, for example. The bypass flow path 21 and the bypass control valve 22 in Embodiment 2 may be applied to Embodiment 1, Embodiment 3, Embodiment 4, or Embodiment 5, for example. The inflow control valve 58 in Embodiment 5 may be applied to Embodiment 4, for example.

REFERENCE SIGNS LIST

1 heat source device 1A heat source device 1B heat source device 1C heat source device 1D heat source device 10 heat source unit 10-1 first heat source unit 10-2 second heat source unit 10-3 third heat source unit 11 refrigerant circuit 11a first refrigerant circuit 11b second refrigerant circuit 11c third refrigerant circuit 11d fourth refrigerant circuit 12 compressor 12a first compressor 12b second compressor 12c third compressor 12d fourth compressor 14 heat-source heat exchanger 14a first heat-source heat exchanger 14b second heat-source heat exchanger 14c third heat-source heat exchanger 14d fourth heat-source heat exchanger 15 fan 15a first fan 15b second fan 15c third fan 15d fourth fan 16 expansion valve
16a first expansion valve 16b second expansion valve 16c third expansion valve 16d fourth expansion valve 17 refrigerant pipe 17a first refrigerant pipe 17b second refrigerant pipe 17c third refrigerant pipe 17d fourth refrigerant pipe 18 heat-medium heat exchanger 18-1 first heat-medium heat exchanger 18-2 second heat-medium heat exchanger 18-3 third heat-medium heat exchanger 19 temperature sensor 19-1 first temperature sensor 19-2 second temperature sensor 19-3 third temperature sensor 21 bypass flow path
21-1 first bypass flow path 21-2 second bypass flow path 21-3 third bypass flow path 22 bypass control valve 22-1 first bypass control valve 22-2 second bypass control valve 22-3 third bypass control valve 50 heat medium channel 50A heat medium channel 50B heat medium channel 50C heat medium channel 51 heat medium pipe 52 heat medium sending device
53 inflow port 54 load device 55 outflow port 55a first outflow port
55b second outflow port 56 load device 58 inflow control valve 58-1 first inflow control valve 58-2 second inflow control valve 80 controller 84 branch 86 junction 100 refrigeration cycle device 100A refrigeration cycle device 100b refrigeration cycle device 100C refrigeration cycle device
100D refrigeration cycle device 180 heat-medium flow path 181 refrigerant flow path 182 heat-medium flow path 183 refrigerant flow path
184 refrigerant flow path

The invention claimed is:

1. A heat source device comprising:
a heat medium channel through which a heat medium flows;
a plurality of refrigerating cycle circuits through each of which refrigerant circulates; and
a plurality of heat-medium heat exchangers configured to cause heat exchange to be performed between the heat medium in the heat medium channel and the refrigerant in the refrigerating cycle circuits,
wherein the plurality of heat-medium heat exchangers include a first heat-medium heat exchanger and a second heat-medium heat exchanger, at least one of the refrigerating cycle circuits being connected to the first heat-medium heat exchanger, a greater number of the refrigerating cycle circuits being connected to the second heat-medium heat exchanger than to the first heat-medium heat exchanger, the refrigerating cycle circuits connected to the second heat-medium heat exchanger being other refrigerating cycle circuits than the at least one refrigerating cycle circuit connected to the first heat-medium heat exchanger.

2. The heat source device of claim 1, wherein the first heat-medium heat exchanger and the second heat-medium heat exchanger are connected in series with the heat medium channel.

3. The heat source device of claim 2, wherein the first heat-medium heat exchanger is disposed downstream of the second heat-medium heat exchanger in the heat medium channel.

4. The heat source device of claim 1, comprising:
a first heat source unit accommodating the first heat-medium heat exchanger and the at least one of the refrigerating cycle circuits connected to the first heat-medium heat exchanger; and
a second heat source unit connected to the first heat source unit by a heat medium pipe, the second heat source unit accommodating the second heat-medium heat exchanger and the refrigerating cycle circuits connected to the second heat-medium heat exchanger.

5. The heat source device of claim 1, wherein the plurality of heat-medium heat exchangers further include a third heat-medium heat exchanger, a fewer number of the refrigerating cycle circuits being connected to the third heat-medium heat exchanger than to the second heat-medium heat exchanger.

6. The heat source device of claim 5, wherein the third heat-medium heat exchanger is disposed downstream of the second heat-medium heat exchanger in the heat medium channel.

7. The heat source device of claim 5, wherein the first heat-medium heat exchanger and the third heat-medium heat exchanger are connected in parallel, and
the first heat-medium heat exchanger and the third heat-medium heat exchanger are connected in series to the second heat-medium heat exchanger.

8. The heat source device of claim 7, comprising an inflow control valve disposed in the heat medium channel to control a flow of the heat medium into one of the first heat-medium heat exchanger and the third heat-medium heat exchanger.

9. The heat source device of claim 5, wherein the number of the refrigerating cycle circuits connected to the third heat-medium heat exchanger is one.

10. The heat source device of claim 1, wherein the number of the refrigerating cycle circuits connected to the first heat-medium heat exchanger is one.

11. The heat source device of claim 1, wherein the heat medium channel comprises:
a bypass flow path disposed in parallel with at least one of the plurality of heat-medium heat exchangers; and
a bypass control valve to control a flow of the heat medium into the bypass flow path.

12. The heat source device of claim 6, comprising:
a first outflow port from which the heat medium passing through the first heat-medium heat exchanger flows out; and
a second outflow port from which the heat medium passing through the third heat-medium heat exchanger flows out.

13. A refrigeration cycle device comprising:
the heat source device of claim 12;
a first load device connected to the first outflow port; and
a second load device connected to the second outflow port.

14. A refrigeration cycle device comprising:
the heat source device of any one of claim 1; and
a first load device connected to the heat source device.

15. The heat source device of claim 1, further comprising:
a compressor provided in each of the plurality of refrigerating cycle circuits; and
a controller configured to control the compressor in each of the plurality of the refrigerating cycle circuits;
the controller is configured to
stop operation of the compressor when the refrigerating cycle circuit stops operation;
preferentially stop the refrigerating cycle circuit connected to the first heat-medium heat exchanger than the refrigerating cycle circuit connected to the second heat-medium heat exchanger when the number of refrigerating cycle circuits in non-operation is less than the number of the refrigerating cycle circuits connected to the second heat-medium heat exchanger; and
preferentially stop the refrigerating cycle circuits connected to the second heat-medium exchanger when the number of the refrigerating cycle circuits in non-operation is greater than or equal to the number of the refrigerating cycle circuits connected to the second heat-medium heat exchanger.

* * * * *